United States Patent
Srinivasan et al.

(10) Patent No.: US 11,507,827 B2
(45) Date of Patent: *Nov. 22, 2022

(54) DISTRIBUTED TRAINING OF REINFORCEMENT LEARNING SYSTEMS

(71) Applicant: DeepMind Technologies Limited, London (GB)

(72) Inventors: Praveen Deepak Srinivasan, London (GB); Rory Fearon, London (GB); Cagdas Alcicek, London (GB); Arun Sarath Nair, London (GB); Samuel Blackwell, London (GB); Vedavyas Panneershelvam, London (GB); Alessandro De Maria, Bromley (GB); Volodymyr Mnih, London (GB); Koray Kavukcuoglu, London (GB); David Silver, Hitchin (GB); Mustafa Suleyman, London (GB)

(73) Assignee: DeepMind Technologies Limited, London (GB)

( * ) Notice: Subject to any disclaimer, the term of this patent is extended or adjusted under 35 U.S.C. 154(b) by 504 days.

This patent is subject to a terminal disclaimer.

(21) Appl. No.: 16/601,455

(22) Filed: Oct. 14, 2019

(65) Prior Publication Data

US 2020/0117992 A1    Apr. 16, 2020

Related U.S. Application Data

(63) Continuation of application No. 15/016,173, filed on Feb. 4, 2016, now Pat. No. 10,445,641.

(Continued)

(51) Int. Cl.
*G06N 3/08* (2006.01)
*G06N 3/04* (2006.01)

(52) U.S. Cl.
CPC .............. *G06N 3/08* (2013.01); *G06N 3/0454* (2013.01); *G06N 3/0472* (2013.01)

(58) Field of Classification Search
None
See application file for complete search history.

(56) References Cited

U.S. PATENT DOCUMENTS

| 8,768,870 B1 | 7/2014 | Corrado et al. |
| 2010/0318480 A1 | 12/2010 | Kim et al. |

(Continued)

FOREIGN PATENT DOCUMENTS

| CN | 103680496 | 3/2014 |

OTHER PUBLICATIONS

CN Office Action in Chinese Appln. No. 201680009087.6, dated Jun. 8, 2020, 19 pages (with English translation).

(Continued)

*Primary Examiner* — Alan Chen
(74) *Attorney, Agent, or Firm* — Fish & Richardson P.C.

(57) ABSTRACT

Methods, systems, and apparatus, including computer programs encoded on computer storage media, for distributed training of reinforcement learning systems. One of the methods includes receiving, by a learner, current values of the parameters of the Q network from a parameter server, wherein each learner maintains a respective learner Q network replica and a respective target Q network replica; updating, by the learner, the parameters of the learner Q network replica maintained by the learner using the current values; selecting, by the learner, an experience tuple from a respective replay memory; computing, by the learner, a gradient from the experience tuple using the learner Q network replica maintained by the learner and the target Q network replica maintained by the learner; and providing, by the learner, the computed gradient to the parameter server.

20 Claims, 5 Drawing Sheets

Related U.S. Application Data (60) Provisional application No. 62/113,318, filed on Feb. 6, 2015.

(56) References Cited

U.S. PATENT DOCUMENTS

2015/0100530 A1 4/2015 Mnih et al.
2017/0278018 A1 9/2017 Mnih

OTHER PUBLICATIONS

EP Summons to attend oral proceedings pursuant to Rule 115(1) EPC in European Appln. No. 16714064.9, dated Mar. 6, 2020, 6 pages.
CN Office Action in Chinese Appln. No. 201680009087.6, dated Dec. 3, 2019, 21 pages (with English translation).
Dean et al., "Large scale distributed deep networks," The 26th annual conference on Neural Information Processing Systems (NIPS'25): Dec. 2012, pp. 1-9, XP055113684.
Duchi et al., "Adaptive Subgradient Methods for Online Learning and Stochastic Optimization," Journal of Machine Learning Research, 12:2121-2159, 2011.
Grounds et al., "Parallel Reinforcement Learning with Linear Function Approximation," Jan. 2008, Adaptive Agents and Multi-Agent Systems III, Adaptation and Multi-Agent Learning; Lecture Notes in Computer Science, pp. 60-74, XP019086619.
Hausknecht et al., Deep Recurrent Q-Learning for Partially Observable MDPs, 2015, Sequential Decision Making for Intelligent Agents Papers from the AAAI 2015 Fall Symposium, pp. 29-37 (Year: 2015).
International Preliminary Report on Patentability issued in International Application No. PCT/US2013/016757, dated Aug. 8, 2017, 8 pages.
International Search Report and Written Opinion in International Application No. PCT/US2016/016757, dated Jun. 24, 2016, 14 pages.
Mnih et al., "Playing Atari with Deep Reinforcement Learning," In NIPS Deep Learning Workshop, pp. 1-9, 2013.
Mnih et al., Human-level control through deep reinforcement learning, Feb. 26, 2015, Nature, vol. 518, pp. 529-533, 13 pages total (Year: 2015).
Plagianakos et al., "An Improved Backpropagation Method with Adaptive Learning Rate," Proceeding of the 2nd Intern, Confer. on: Circuits, Systems and Computers, pp. 1-5, 1998.
Printista et al., "A parallel implementation of Q-Learning based on communication with cache," Journal of Computer Science & Technology, May 2002, pp. 1-11, XP055280064.
Riedmiller, "Neural Fitted Q Iteration—First Experiences with a Data Efficient Neural Reinforcement Learning Method," Jan. 2005, Machine Learning: ECML 2005 Lecture Notes in Computer Science; Lecture Notes in Artificial Intelligence; LNCS, pp. 317-328, XP019021214.
Tuchenko et al., "Parallel batch pattern training algorithm for deep neural network," 2014 International Conference on High Performance Computing & Simulation (HPCS), IEEE, Jul. 2014, pp. 697-702, XP032646430.

DISTRIBUTED TRAINING OF REINFORCEMENT LEARNING SYSTEMS

CROSS-REFERENCE TO RELATED APPLICATIONS

This is a continuation of U.S. application Ser. No. 15/016,173, filed on Feb. 4, 2016, which claims priority to U.S. Provisional Application No. 62/113,318, filed on Feb. 6, 2015. The disclosures of the prior applications are considered part of and are incorporated by reference in the disclosure of this application.

BACKGROUND

This specification relates to training a reinforcement learning system.

Reinforcement learning agents interact with an environment by receiving an observation that characterizes the current state of the environment, and in response, performing an action from a predetermined set of actions. Reinforcement learning agents generally receive rewards in response to performing the actions and select the action to be performed in response to receiving a given observation in accordance with an output of a value function. Some reinforcement learning agents use a neural network in place of a value function, e.g., to approximate the outcome of the value function by processing the observation using the neural network and selecting an action based on the output of the neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to training a reinforcement learning system.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By parallelizing training, a reinforcement learning system can be trained faster. Additionally, a reinforcement learning system trained using the distributed learning techniques described in this specification can, after training, have an improved performance on reinforcement learning tasks than the same reinforcement learning system trained using a non-distributed reinforcement learning training technique. By providing an architecture that allows a distributed reinforcement learning training system to include arbitrary numbers of learners, actors, and replay memories, the system can easily be adapted for training a system to perform various reinforcement learning tasks. Additionally, the numbers of learners, actors, and, optionally, replay memories can easily be adjusted during training, resulting in improved performance.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes techniques for distributed training of a reinforcement learning system. In particular, the reinforcement learning system being trained includes an agent that interacts with an environment. In order to interact with the environment, the agent receives observations characterizing the current state of the environment and selects an action to be performed using the observation. In response to performing the selected action, the agent receives a reward. While interacting with the environment, the agent attempts to maximize the total reward received by the agent in response to all of the actions selected by the agent.

In particular, in response to a given observation, the agent selects the action to be performed using a Q network. The Q network is a deep neural network that is configured to receive as an input an observation and an action and to process the input to generate a neural network output in accordance with current values of a set of parameters of the Q network. In some implementations, the agent selects the action that, when provided with the given observation as input to the Q network, results in the Q network generating the highest neural network output of any of the actions in the predetermined set of actions. In some other implementations, the agent uses an ε-greedy policy in selecting the action, i.e., the agent selects an action randomly from the predetermined set of actions with probability ε and selects the action that results in the Q network generating the highest neural network output with probability 1-ε.

During the training of the reinforcement learning system, a distributed reinforcement learning training system trains the reinforcement learning system to adjust the values of the parameters of the Q network from initial values of the parameters. In some implementations, the reinforcement learning system is being trained offline, with the training system training the reinforcement learning system to determine trained values of the parameters of the Q network. The trained values are then used by the agent in interacting with the environment at runtime. In some other implementations, the reinforcement learning system is being trained online, with the training system continuously adjusting the values of the parameters of the Q network used by the agent as the agent interacts with the environment at runtime.

Generally, the distributed reinforcement learning training system includes one or more actors, one or more learners, and one or more replay memories. Optionally, the distributed reinforcement learning training system also includes a parameter server.

Figure 1:
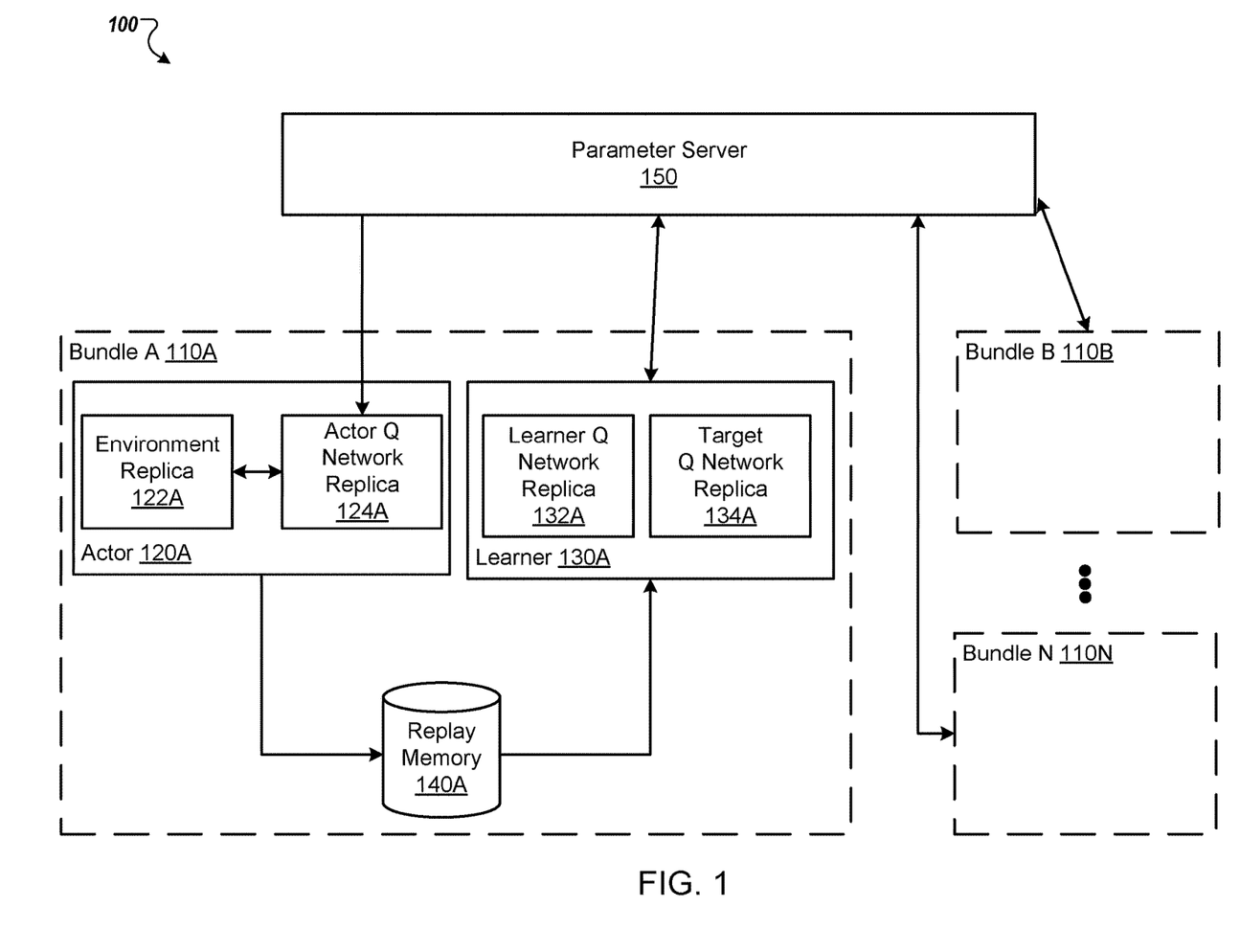
FIG. 1 shows an example distributed reinforcement learning training system.

FIG. 1 shows an example distributed reinforcement learning training system 100. The distributed reinforcement learning training system 100 is an example of a system implemented as computer programs on one or more computers in one or more locations in which the systems, components, and techniques described below are implemented.

The distributed reinforcement learning training system 100 includes multiple bundles 110A-110N and a parameter server 150. Each of the bundles 110A-N is implemented on a respective computing unit. A computing unit may be, e.g., a computer, a core within a computer having multiple cores, or other hardware or software within a computer capable of independently performing the computation for the bundle.

Each of the bundles 110A-110N includes a respective actor, e.g., an actor 120A in bundle 110A, a respective learner, e.g., a learner 130A in bundle 110A, and a respective replay memory, e.g., a replay memory 140A in bundle 110A.

Each actor in each of the bundles interacts with a respective replica of the same environment and maintains a replica of the Q network that is being trained, referred to in this specification as an actor Q network replica. For example, the actor 120A interacts with an environment replica 122A and maintains an actor Q network replica 124A. A replica of a Q network is a neural network that has the same neural network architecture as the Q network, with possibly different parameter values, i.e., from other replicas of the Q network.

In particular, during training, the actor in each of the bundles interacts with the replica of the environment to generate experience tuples and stores the experience tuples in a replay memory. Each actor interacts with the environment replica by receiving a current observation that characterizes the current state of the environment replica.

The actor then uses the actor Q network replica maintained by the actor to determine the action to perform in response to receiving the observation. Determining the action to perform in response to receiving the observation is described in more detail below with reference to FIG. 3.

Once the actor has performed the determined action or has instructed another system to perform the determined action, the actor receives a reward and a next observation characterizing the next state of the environment replica, i.e., the state of the environment replica after the selected action has been performed. The actor then generates an experience tuple and stores the experience tuple in the replay memory. The experience tuple includes the current observation that characterizes the current state of the environment instance, the action performed in response to receiving the current observation, the reward received by the actor for performing the action, and the next observation that characterizes the next state of the environment replica. For example, the actor 120A stores experience tuples in the replay memory 140A.

The learner in each of the bundles maintains two respective replicas of the Q network: one replica that will be referred to in this specification as a learner Q network replica and another replica that will be referred to in this specification as a target Q network replica. For example, the learner 130A maintains a learner Q network replica 132A and a target Q network replica 134A. In some implementations, the learner Q network replica maintained by the learner is the same instance of the Q network as the actor Q network replica maintained by the actor in the same bundle as the learner, i.e., either the learner and the actor in the bundle share an instance of the Q network or the values of the parameters of the actor Q network replica and the learner Q network replica are otherwise synchronized.

As will be described in more detail below, the values of the parameters of the learner Q network replica maintained by a given learner will generally be updated more frequently than the values of the parameters of the target Q network replica maintained by the learner.

Each of the learners selects experience tuples from the replay memory in the same bundle as the learner, e.g., the learner 130A selects experience tuples from the replay memory 140A, and computes a gradient for each experience tuple using the tuple and the Q network replicas maintained by the learner. Computing a gradient is described below with reference to FIG. 4. The learner transmits the computed gradients to the parameter server 150 through a network, e.g., a local area network (LAN) or wide area network (WAN), e.g., the Internet.

The parameter server 150 maintains the current values of the parameters of the Q network and updates the maintained values as gradients are uploaded to the server by the learners. In particular, the parameter server 106 receives gradient updates from the learners and applies the gradients to modify the current values of the parameters of the Q network using a conventional machine learning training algorithm, e.g., a stochastic gradient descent algorithm.

The parameter server 150 provides updated parameter values to each of the bundles periodically during training. The actor and learner in the bundle can use the received updated parameter values to update the values of the parameters of the Q network replicas maintained by the actor and the learner. Updating parameter values during training and providing updated parameter values is described in more detail below with reference to FIG. 5.

Optionally, the functionality of the parameter server 150 can be partitioned among multiple parameter server shards. That is, each of the parameter server shards can maintain values of a respective subset of the parameters of the Q network, such that the parameters of the model are partitioned among the parameter server shards. In these cases, each parameter server shard can be implemented on a respective independent computing unit, with the computing units being configured so that they can operate independently of each other. In these cases, each shard of the parameter server 150 can apply gradient updates for the parameters that are assigned to that shard independently of each other shard. Additionally, each shard of the parameter server 150 can apply provided updated values for the parameters that are assigned to the shard independently of each other shard.

Thus, each bundle generates experience tuples, computes gradients, and provides the computed gradients to the parameter server 150 independently of and asynchronously from each other bundle. In particular, the only information shared between bundles during training are the parameter value updates received by each of the bundles from the parameter server 150.

Additionally, during the training, the learners collectively train the Q network to determine the trained values of the network parameters by providing the computed gradients to the parameter server 150 and without needing to transmit or receive data from any other learners.

In some implementations, a distributed reinforcement learning training system may have a different architecture in which actors, learners, and replay memories are not grouped into bundles, allowing the distributed reinforcement learning training system to have different numbers of actors, learners, and replay memories. With this different architecture, each learner can operate independently from not only each other learner, but also from any one actor.

Figure 2:
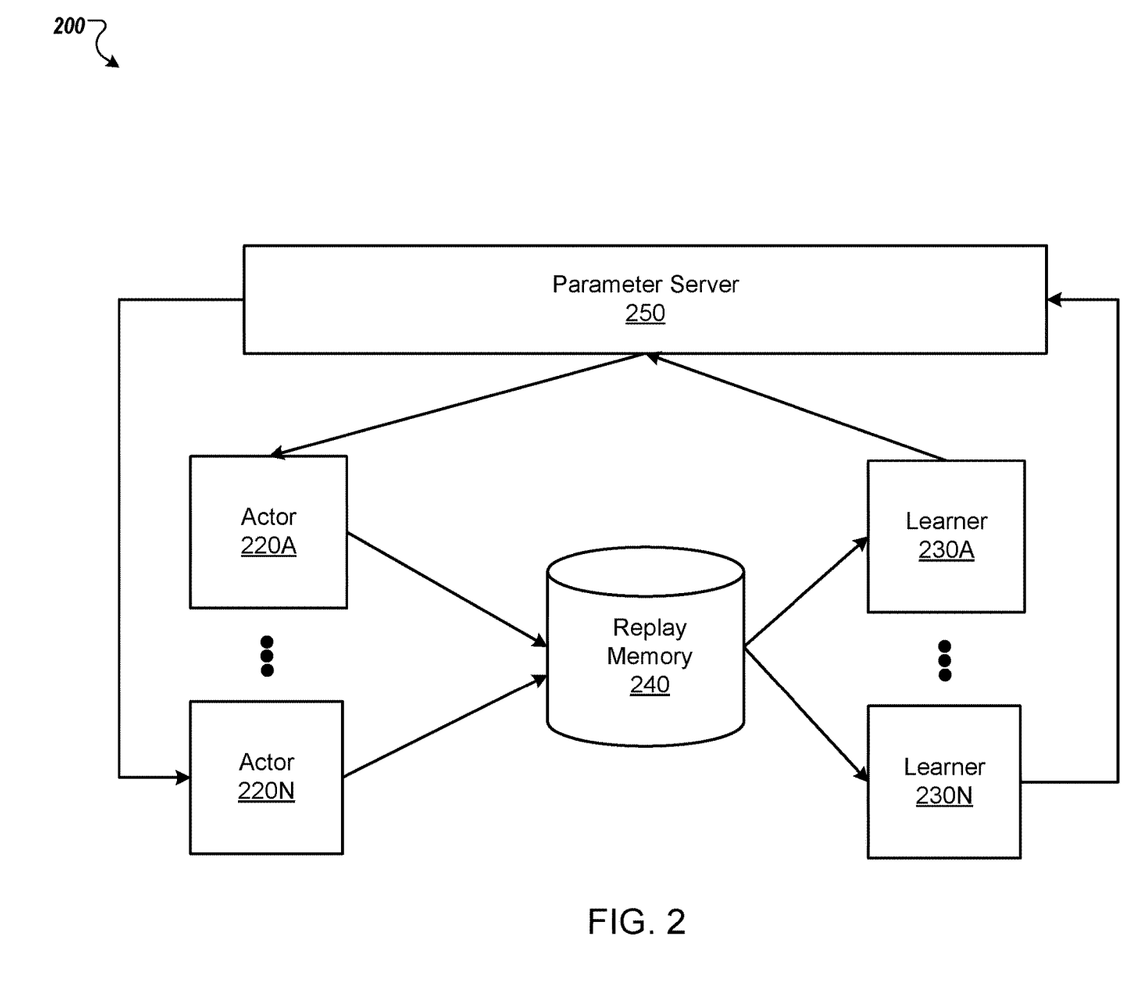
FIG. 2 shows another example distributed reinforcement learning training system.

FIG. 2 shows another example distributed reinforcement learning training system 200. The distributed reinforcement learning training system 200 is an example of a system implemented as computer programs on one or more computers in one or more locations, in which the systems, components, and techniques described below are implemented.

Like the distributed reinforcement learning training system 100 of FIG. 1, the distributed reinforcement learning training system 200 includes multiple actors 220A-N and multiple learners 230A-N. However, unlike the system 100 of FIG. 1, there is not a one-to-one coupling of actors to learners in the distributed reinforcement learning training system 200.

In particular, the reinforcement learning training system 200 includes multiple actors 220A-N that each interact with a respective replica of the environment to generate experience tuples that are stored in a central replay memory 240. As in FIG. 1, each actor 220A-N generates experience tuples using a respective actor Q network replica maintained by the actor. However, the parameter values of the actor Q network replica of any given actor are not synchronized with the parameters of the learner Q network replica of any of the learners 230A-N.

During training, each of the learners 230A-N in the reinforcement learning training system 200 selects experience tuples from the central replay memory 204 and processes the tuples using a respective learner Q network replica and a respective target Q network replica maintained by the learner to compute gradients for the experience tuples. Thus, each learner can select from experience tuples generated by multiple actors. Each learner then transmits the gradients to a parameter server 250 through a network. The parameter server 250 then updates the parameters of the Q network and provides the updated parameter values to the actors 220A-220N and the learners 230A-230N.

Because the actors 220A-220N and the learners 230A-230N are not coupled, the reinforcement learning training system 200 can include different numbers of actors than learners. In some implementations, in the reinforcement learning training system 200, each actor 220A-220N and each learner 230A-230N is implemented on a respective computing unit.

While in the example of FIG. 2, the reinforcement learning training system 200 includes a single central replay memory 240, in some implementations, the reinforcement learning training system 200 can include multiple replay memories, with each actor storing experience tuples in an assigned one of the multiple replay memories. Similarly, each of the learners 230A-230N can be assigned a replay memory of the multiple replay memories from which to select the experience tuples the learner uses to compute gradients during training.

Similarly, while in the example of FIG. 2 the reinforcement learning training system 200 includes multiple actors and multiple learners, in some implementations, the reinforcement learning training system 200 can include only a single actor and multiple learners. In this case, each of the multiple learners operates on experience tuples generated by the single actor.

Additionally, while in the example of FIG. 2 the reinforcement learning training system 200 includes multiple actors and multiple learners, in some implementations, the reinforcement learning training system 200 can include multiple actors and a single learner. In this case, the reinforcement learning training system 200 may not include the parameter server 250. That is, the single learner can process tuples from the replay memory 240 and compute both the gradients and the updated parameter values. The single learner or another process in the reinforcement learning training system 200 can then provide the updated parameter values to each of the multiple actors.

Figure 3:
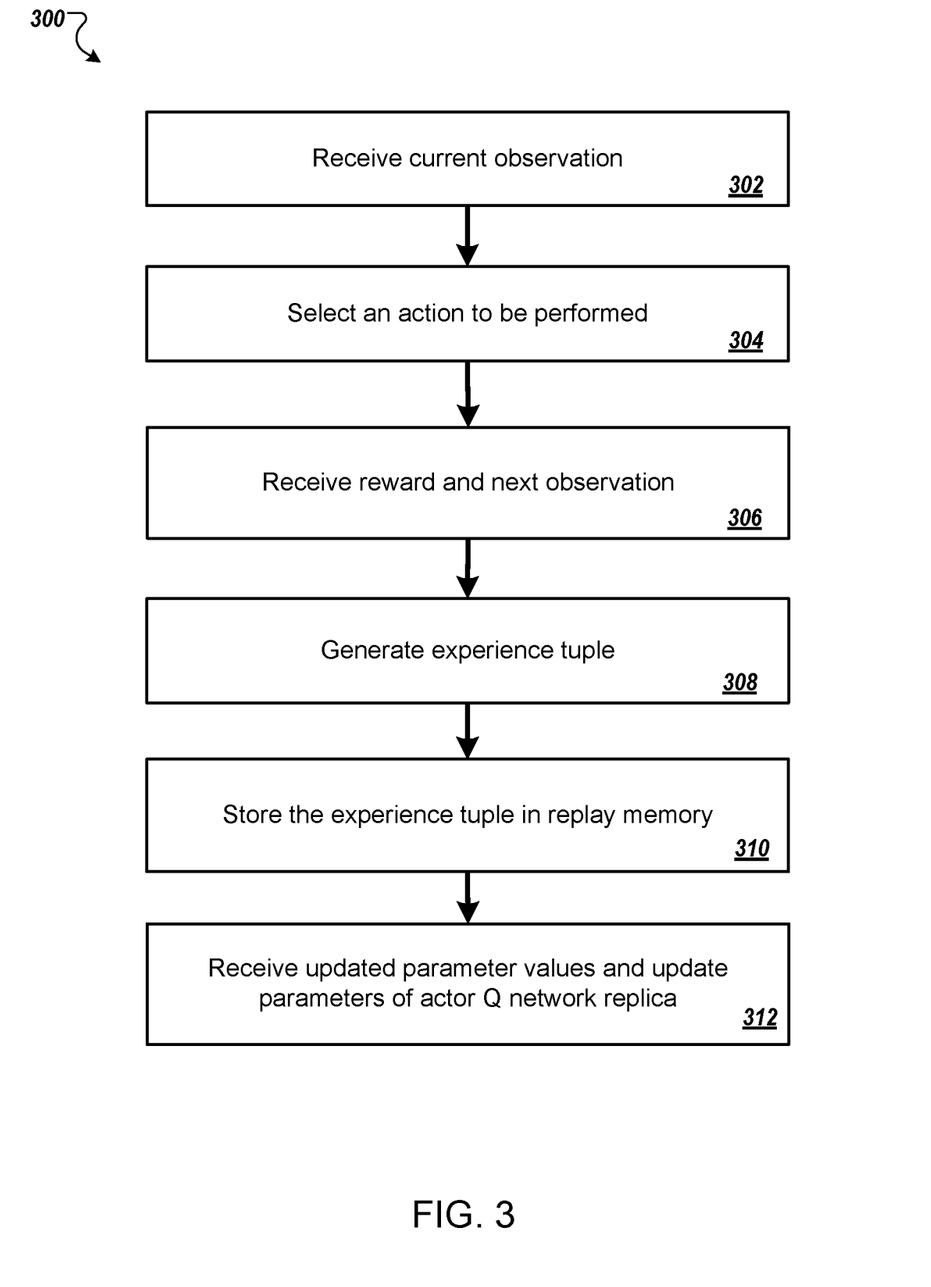
FIG. 3 is a flow diagram of an example process for generating an experience tuple during training of a reinforcement learning system.

FIG. 3 is a flow diagram of an example process 300 for generating an experience tuple during training of a reinforcement learning system. For convenience, the process 300 will be described as being performed by an actor, e.g., one of the actors 120A-N of FIG. 1 or one of the actors 220A-N of FIG. 2.

The actor receives a current observation characterizing the current state of the environment replica that is being interacted with by the actor (step 302).

The actor processes the current observation using the replica of the Q network maintained by the actor to select an action to be performed in response to the current observation (step 304). In particular, the Q network replica maintained by the actor is a deep neural network that is configured to take as an input an action and an observations and generate a neural network output in accordance with current values of the parameters of the deep neural network. In order to select the action to be performed, the actor determines the action that, when provided with the current observation as input to the Q network replica, results in the actor Q network replica generating the highest neural network output. In some implementations, the actor uses an ε-greedy policy in selecting the action, i.e., selects the action that generates the highest neural network output with probability 1-ε and selects an action randomly from the predetermined set of actions with probability ε.

In response to the action being performed, the actor receives a reward and a next observation characterizing the next state of the environment replica, e.g., the state of the environment replica after the selected action is performed (step 306).

The actor generates an experience tuple that includes the current observation, the selected action, the received reward, and the next observation (step 308).

The actor stores the experience tuple in a replay memory (step 310). In some implementations, the replay memory is local to the actor, i.e., is only accessible to the actor and not any other actors. In some other implementations, the replay memory is shared with one or more other actors, i.e., multiple actors store their experience tuples in the same replay memory.

The actor receives updated parameter values and updates the parameters of the actor Q network replica maintained by the actor with the updated parameter values (step 312). In implementations where the distributed reinforcement learning training system includes a parameter server, the actor receives the updated parameter values from the parameter server. In implementations whether the distributed reinforcement learning training system does not include a parameter server, i.e., in implementations where the system includes only a single learner, the actor can receive the updated parameter values directly from the single learner.

Each actor that is included in the distributed reinforcement learning training system can perform the process 300 multiple times during training of the reinforcement learning training system. Because each actor performs each iteration of the process 300 independently from each other actor during training, each actor may explore different portions of the state space of the environment than each other actor. Thus, in implementations where the distributed reinforcement learning training system includes multiple actors, the reinforcement learning system can be trained on a greater variety of experience tuples than when trained using a reinforcement learning training system that is not distributed.

Figure 4:
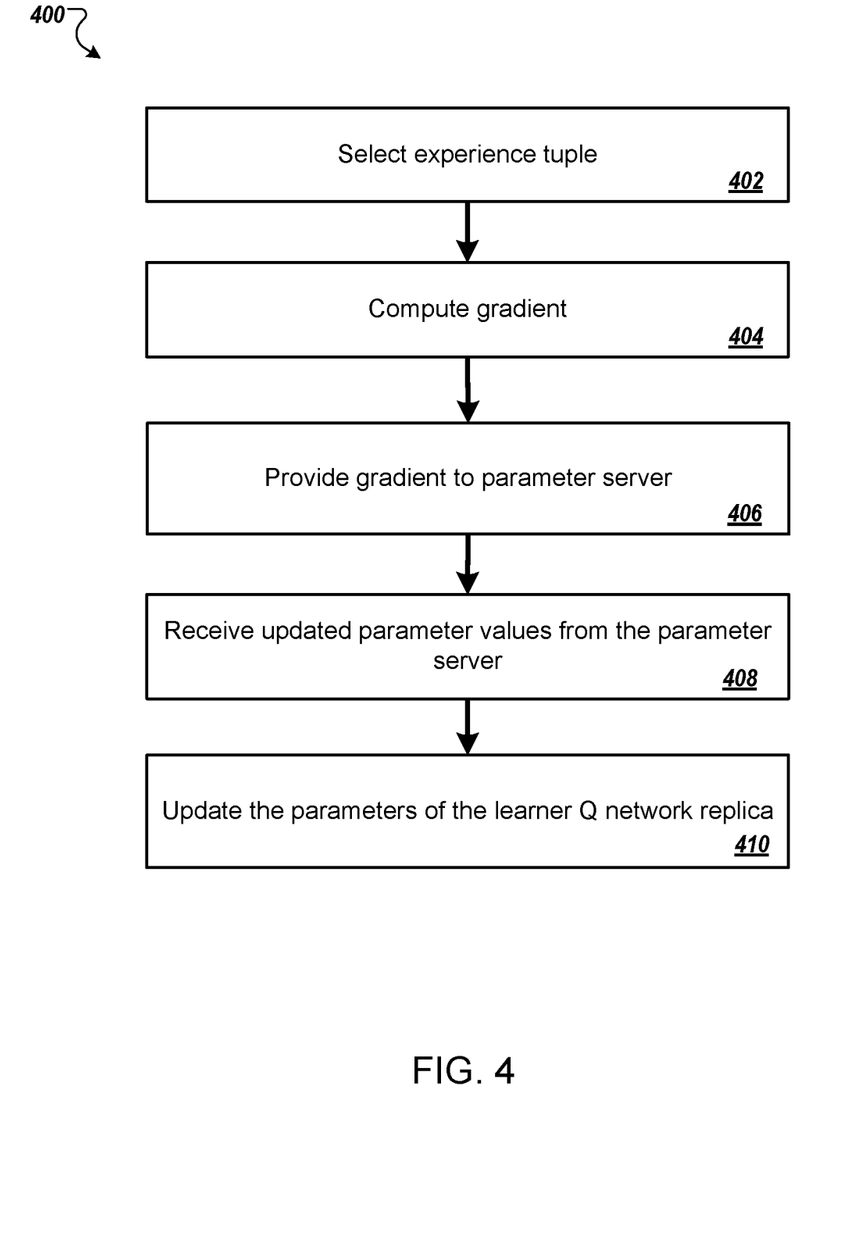
FIG. 4 is a flow diagram of an example process for computing a gradient during training of a reinforcement learning system.

FIG. 4 is a flow diagram of an example process 400 for computing a gradient during training of a reinforcement learning system. For convenience, the process 400 will be described as being performed by a learner, e.g., one of the learners 130A-N of FIG. 1 or one of the learners 230A-N of FIG. 2.

The learner selects an experience tuple from a replay memory (step 402). In some implementations, e.g., when the learner is part of a bundle that includes a replay memory, the replay memory is specific to the learner. In some other implementations, the replay memory is shared by multiple learners and each of the learners selects experience tuples from the same replay memory. In either case, the learner may select the experience tuple from the replay memory by sampling a tuple randomly from the tuples that are stored in the replay memory.

The learner computes a gradient using the experience tuple (step 404). In particular, the learner maintains a learner Q network replica and a target Q network replica. The learner Q network replica and the target Q network replica are both deep neural networks having the same network architecture as the Q network and the same network architecture as the actor Q network replicas maintained by each of the actors, but with possibly different values of the parameters of the deep neural network, both from each other and from the actor Q network replicas. Thus, like the actor Q network replicas maintained by the actors, the target Q network replica and the learner Q network replica are configured to take as an input an action and an observation and generate a neural network output in accordance with current values of the parameters of the respective deep neural network. In particular, as will be described in more detail below, the parameter values of the learner Q network replica maintained by the learner are updated more frequently during the training of the reinforcement learning system than the parameter values of the target Q network replica maintained by the learner.

In order to compute the gradient using the experience tuple, the learner processes the selected action and the current observation from the tuple using the learner Q network replica to determine a learner Q network output for the selected action.

The learner also determines the largest target Q network output that is generated by processing the next observation from the tuple with any of the actions in the predetermined set of actions.

The learner then computes the gradient of a loss function using the reward from the tuple, the learner Q network output, and the largest target Q network output. The loss function and computing the gradient of the loss function is described in Mnih, Volodymyr, Kavukcuoglu, Koray, Silver, David, Graves, Alex, Antonoglou, Ioannis, Wierstra, Daan, and Riedmiller, Martin, *Playing atari with deep reinforcement learning*, In NIPS Deep Learning Workshop, 2013 and in U.S. patent application Ser. No. 14/097,862, filed Dec. 5, 2013 and titled "COMPUTER SYSTEM," the entire contents of each of which are hereby incorporated by reference herein.

The learner provides the gradient to a parameter server (step 406). That is, the learner transmits the gradients to the parameter server over a network. If the parameter server is sharded, the learner can transmit, to each of the shards, the portion of the gradient that corresponds to the parameter partition maintained by the shard.

The learner receives updated parameter values from the parameter server (408). The parameter updates include updated values for the parameters of the learner Q network replica maintained by the learner and, optionally, updated values for the parameters of the target Q network replica maintained by the learner. In particular, if the learner processes the experience tuples in multiple tuple batches, the learner may receive parameter updates for the learner Q network replica one or more times during processing of a given batch. However, the learner may receive updates for the parameters of the target Q network replica at longer intervals. Thus, not every parameter value update received from the parameter server will include updated values for the parameters of the target Q network replica.

The learner updates the parameters of the learner Q network replica and, optionally, the target Q network replica using the parameter updates (step 410).

Each learner in the distributed reinforcement learning training system can perform multiple iterations of the process 400 during the training. In particular, each learner can perform the process 400 independently of and asynchronously from each other learner in the system.

In implementations where the distributed reinforcement learning training system includes only a single learner and does not include the parameter server, rather than provide gradients to the parameter server and then receive parameter value updates from the parameter server, the learner computes the updated parameter values, e.g., as described below with reference to FIG. 5, and provides the updated parameter values to the actors that are included in the distributed reinforcement learning training system.

Figure 5:
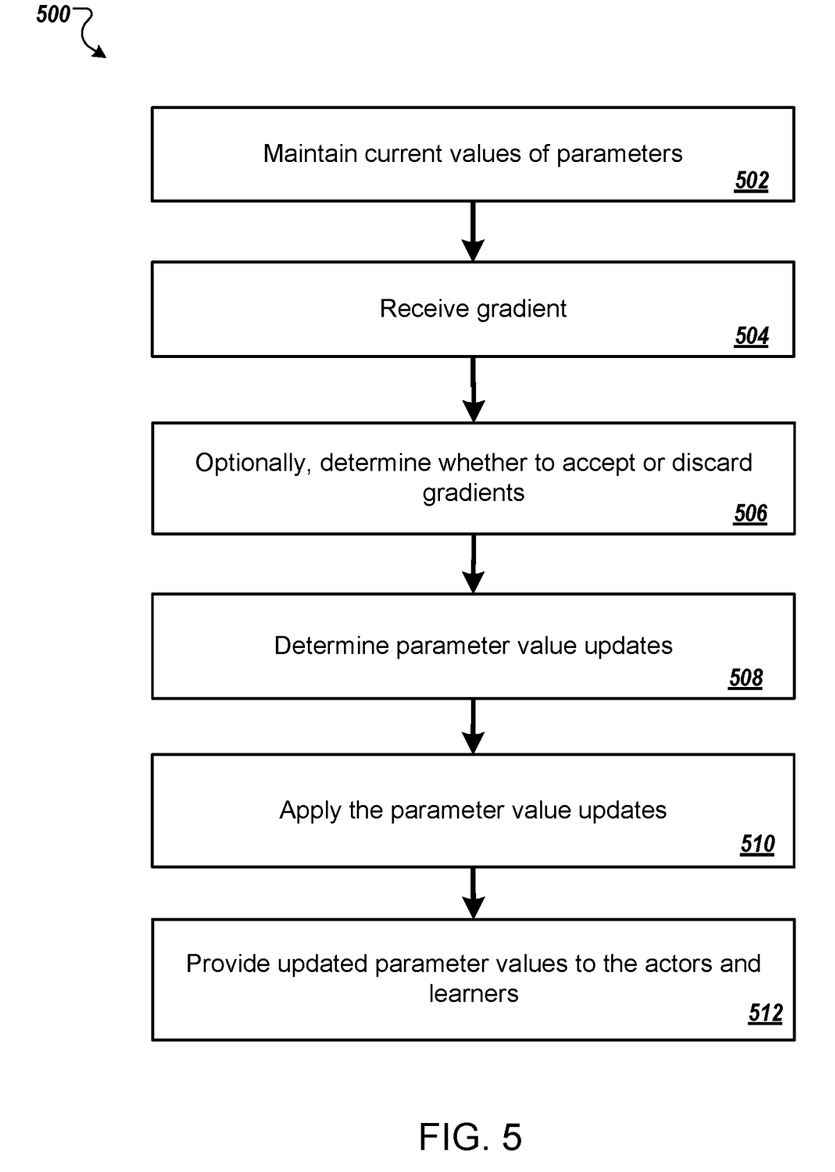
FIG. 5 is a flow diagram of an example process for updating parameter values during training of a reinforcement learning system.

FIG. 5 is a flow diagram of an example process 500 for updating parameter values during training of a reinforcement learning system. For convenience, the process 500 will be described as being performed by a parameter server, e.g., the parameter server 150 of FIG. 1 or the parameter server 250 of FIG. 2.

The parameter server maintains current values of the parameters of a Q network (step 502). In implementations where the training is performed offline, once the training procedure is terminated, the values of the parameters of the Q network maintained by the parameter become the trained values used by the agent in interacting with the environment. In some implementations, however, the training is being performed on-line, with the actors in the system being the agents of the reinforcement learning system that is being trained. In these cases, rather than determining trained values of the parameters and then terminating the training, the parameter values of the agents can be continuously updated as they continue to interact with the environment.

The parameter server receives gradients from one or more learners (step 504). The parameter server receives gradients from the learners asynchronously, as each learner operates independently from each other learner during the training.

Optionally, the parameter server can determine, for each received gradient, whether to accept or discard the gradient (step 506). For example, in some implementations, the parameter server can track the time delay between the values of the parameters used by the learner that computed the gradient and the values of the parameters maintained by the parameter server. The parameter server can then discard all gradients for which the delay is longer than a threshold. Thus, gradients that are computed using parameter values that are too stale are discarded rather than being accepted by the parameter server. As another example, each learner can keep a running average and standard deviation of the absolute DQN loss for the data it sees. Either the learner or the parameter server can then discard gradients with an absolute loss that is higher than the mean plus a threshold number of standard deviations.

The parameter server determines parameter value updates from the received gradients (step 508) and applies the parameter value updates to the current values of the parameters maintained by the parameter server to determine updated values of the parameters (step 510). In particular, the parameter server determines parameter value updates from the received gradients using a conventional machine learning training technique, e.g., a stochastic gradient descent training technique. Optionally, the training technique can include an adaptive learning rate. Example machine learning training techniques that use adaptive learning rates are described in J. C. Duchi, E. Hazan, and Y. Singer, Adaptive Subgradient Methods for Online Learning and Stochastic Optimization, *Journal of Machine Learning Research,* 12:2121-2159, 2011, and in V. P. Plagianakos, D. G. Sotiropoulos and M. N. Vrahatis, An Improved Backpropagation Method with Adaptive Learning Rate. *Proceeding of the 2nd Intern. Confer. on: Circuits, Systems and Computers,* 1998.

The parameter server provides updated parameter values to each of the actors and each of the learners in the distributed reinforcement learning training system (step 512). In particular, after each update of the parameters, the parameter server provides the updated parameter values to the actors and the learners for use in updating the parameters of the actor Q network replicas and the learner Q network replicas maintained by the actors and the learners. The parameter server also determines whether criteria are satisfied for providing updated parameter values for target Q network replicas maintained by the learners and, if the criteria are satisfied, provides data to the learners that indicates the updated parameters are also to be used to update the parameter values of the target Q network replicas. In some implementations, the server determines that the criteria have been satisfied when the server has made a threshold number of parameter updates to the values maintained by the server since the last time the target Q network replica parameters were updated or when a threshold amount of time has elapsed since the last time the target Q network replica parameters were updated.

The process 500 can be performed multiple times during training of the reinforcement learning system. For example, the parameter server can perform the process 500 repeatedly on received gradients until no more gradients are being received, until the parameter updates satisfy a predetermined termination condition, or until the training is terminated, by a system administrator, for example.

In some implementations, the parameter server includes multiple shards, each of which operates independently from each other shard, and each of which maintains values for a respective disjoint partition of the parameters of the Q network. In these implementations, each shard of the parameter server can perform the process 500 independently of each other shard for the parameter values that are maintained by the shard.

In some cases, during the training, it may be beneficial to modify the number of actors, learners, or both that are involved in the training. For example, the distributed training system can determine that the number of actors or learners should be adjusted by monitoring the number of reads and writes to the replay memory. That is, when the number of writes to the memory exceeds the number of reads from the memory by more than a threshold, the system can determine that the number of learners needs to be increased relative to the number of actors. When the number of reads exceeds the number of writes by more than a threshold, the system can determine that the number of actors needs to be increased relative to the number of learners.

As another example, the system can monitor the throughput of the parameter server to determine when the number of actors or learners should be adjusted. For example, if the number of updates to the parameters of the Q network is less than the number of new experience tuples added to the replay memory, the system can determine that the number of learners should be increased relative to the number of actors.

As another example, the system can monitor the number of gradients discarded during training. If the portion of gradients that are being discarded exceeds a threshold proportion, then the system can determine that the number of learners should be decreased or that the performance of the parameter server should be increased, e.g., by allocating the parameter server more computing resources or increasing the number of parameter shards.

In architectures when the learners and actors in the system are not bundled, once the system determines that the numbers of learners or actors should be adjusted, a learner can be added or removed without changing the number of actors, and vice versa. In architectures when each learner is bundled with an actor, the number of actors and learners can be changed by adding a bundle to or removing a bundle from the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for training a Q network used to control an agent that interacts with an environment by receiving observations characterizing a current state of the environment and performing an action from a predetermined set of actions in response to each observation, wherein the Q network is a deep neural network that is configured to receive as input an observation and an action and to generate a neural network output from the input in accordance with a set of parameters, wherein training the Q network comprises adjusting the values of the set of parameters of the Q network, and wherein the system comprises one or more computing units and one or more storage devices storing instructions that when executed by the one or more computing units cause the one or more computing units to implement:

one or more actors, wherein each actor executes on a respective computing unit, wherein each actor is configured to operate independently of each other actor, wherein each actor interacts with a respective replica of the environment, wherein each actor maintains a respective actor Q network replica, and wherein each actor is further configured to repeatedly perform operations comprising:

receiving, from a parameter server, current values of the parameters of the Q network;

updating the values of the parameters of the actor Q network replica maintained by the actor using the current values;

receiving an observation characterizing a current state of the environment replica interacted with by the actor;

selecting an action to be performed in response to the observation using the actor Q network replica maintained by the actor;

receiving a reward in response to the action being performed and a next observation characterizing a next state of the environment replica interacted with by the actor;

generating an experience tuple that comprises the current observation, the action selected, the reward, and the next observation; and storing the experience tuple in a respective replay memory for the actor for use in training the Q network.

2. The system of claim 1, wherein, when executed by the one or more computing units, the instructions further cause the one or more computing units to implement:

a plurality of learners, wherein each learner executes on a respective computing unit, wherein each learner is configured to operate independently of each other learner, wherein each learner maintains a respective learner Q network replica and a respective target Q network replica, and wherein each learner is further configured to repeatedly perform operations comprising:

receiving, from the parameter server, current values of the parameters of the Q network;

updating the parameters of the learner Q network replica maintained by the learner using the current values;

selecting an experience tuple from a respective replay memory for the learner;

computing a gradient from the experience tuple using the learner Q network replica maintained by the learner and the target Q network replica maintained by the learner; and providing the computed gradient to the parameter server.

3. The system of claim 2, further comprising:

the parameter server, wherein the parameter server is configured to repeatedly perform operations comprising:

receiving a succession of gradients from the plurality of learners;

computing updates to the values of the parameters of the Q network using the gradients;

updating the values of the parameters of the Q network using the computed updates; and providing the updated values of the parameters to the one or more actors and the plurality of learners.

4. The system of claim 3, wherein the parameter server comprises a plurality of parameter server shards, wherein each shard is configured to maintain values of a respective disjoint partition of the parameters of the Q network, and wherein each shard is configured to operate asynchronously with respect to every other shard.

5. The system of claim 3, wherein the operations that the parameter server is configured to perform further comprise:

determining whether criteria are satisfied for updating the parameters of the target Q network replicas maintained by the learners; and when the criteria are satisfied, providing data to the learners indicating that the updated parameter values are to be used to update the parameters of the target Q network replicas.

6. The system of claim 5, wherein the operations that each of the learners is configured to perform further comprise:

receiving data indicating that the updated parameter values are to be used to update the parameters of the target Q network replica maintained by the learner; and updating the parameters of the target Q network replica maintained by the learner using the updated parameter values.

7. The system of claim 2, wherein each of the learners is bundled with a respective one of the actors and a respective replay memory, wherein each bundle of an actor, a learner, and a replay memory is implemented on a respective computing unit, wherein each bundle is configured to operate independently from each other bundle, and wherein, for each bundle, the learner in the bundle selects from among experience tuples generated by the actor in the bundle.

8. The system of claim 7, wherein, for each bundle, the current values of the parameters of the actor Q network replica maintained by the actor in the bundle are synchronized with the current values of the parameters of the learner Q network replica maintained by the learner in the bundle.

9. The system of claim 2, wherein selecting an action to be performed in response to the observation using the actor Q network replica maintained by the actor comprises:

determining an action from the predetermined set of actions that, when provided as input to the actor Q network replica maintained by the actor with the current observation, generates a largest actor Q network replica output.

10. The system of claim 9, wherein selecting an action to be performed in response to the observation using the actor Q network replica maintained by the actor further comprises:
selecting a random action from the set of predetermined actions with probability ε and selecting the determined action with probability 1−ε.

11. The system of claim 2, wherein computing a gradient from the experience tuple using the learner Q network replica maintained by the learner and the target Q network replica maintained by the learner comprises:
processing the action from experience tuple and the current observation from the experience tuple using the learner Q network replica maintained by the learner to determine a learner Q network replica output;
determining a largest target Q network replica output that is generated by processing any of the actions in the predetermined set of actions with the next observation from the experience tuple using the target Q network replica maintained by the learner; and
computing the gradient using the learner Q network replica output, the largest target Q network replica output, and the reward from the experience tuple.

12. A method for training a Q network used to control an agent that interacts with an environment by receiving observations characterizing a current state of the environment and performing an action from a predetermined set of actions in response to each observation, wherein the Q network is a deep neural network that is configured to receive as input an observation and an action and to generate a neural network output from the input in accordance with a set of parameters, wherein training the Q network comprises adjusting the values of the set of parameters of the Q network, and wherein the method comprises:
receiving, by one of one or more actors and from a parameter server, current values of the parameters of the Q network, wherein each actor is configured to operate independently of each other actor, and wherein each actor interacts with a respective replica of the environment, wherein each actor maintains a respective actor Q network replica;
updating, by the actor, the values of the parameters of the actor Q network replica maintained by the actor using the current values;
receiving, by the actor, an observation characterizing a current state of the environment replica interacted with by the actor;
selecting, by the actor, an action to be performed in response to the observation using the actor Q network replica maintained by the actor;
receiving, by the actor, a reward in response to the action being performed and a next observation characterizing a next state of the environment replica interacted with by the actor;
generating, by the actor, an experience tuple that comprises the current observation, the action selected, the reward, and the next observation; and
storing, by the actor, the experience tuple in a respective replay memory for the actor for use in training the Q network.

13. The method of claim 12, further comprising:
receiving, by a learner of a plurality of learners, current values of the parameters of the Q network from the parameter server, wherein each learner executes on a respective computing unit, wherein each learner is configured to operate independently of each other learner, and wherein each learner maintains a respective learner Q network replica and a respective target Q network replica;
updating, by the learner, the parameters of the learner Q network replica maintained by the learner using the current values;
selecting, by the learner, an experience tuple from a respective replay memory for the learner;
computing, by the learner, a gradient from the experience tuple using the learner Q network replica maintained by the learner and the target Q network replica maintained by the learner; and
providing, by the learner, the computed gradient to the parameter server.

14. The method of claim 13, further comprising:
receiving, by the parameter server, a succession of gradients from the plurality of learners;
computing, by the parameter server, updates to the values of the parameters of the Q network using the gradients;
updating, by the parameter server, the values of the parameters of the Q network using the computed updates; and
providing, by the parameter server, the updated values of the parameters to the one or more actors and the plurality of learners.

15. The method of claim 14, wherein the parameter server comprises a plurality of parameter server shards, wherein each shard is configured to maintain values of a respective disjoint partition of the parameters of the Q network, and wherein each shard is configured to operate asynchronously with respect to every other shard.

16. The method of claim 14, further comprising:
determining, by the parameter server, whether criteria are satisfied for updating the parameters of the target Q network replicas maintained by the learners; and
when the criteria are satisfied, providing, by the parameter server, data to the learners indicating that the updated parameter values are to be used to update the parameters of the target Q network replicas.

17. The method of claim 16, further comprising:
receiving, by the learner, data indicating that the updated parameter values are to be used to update the parameters of the target Q network replica maintained by the learner; and
updating, by the learner, the parameters of the target Q network replica maintained by the learner using the updated parameter values.

18. The method of claim 13, wherein each of the learners is bundled with a respective one of the actors and a respective replay memory, wherein each bundle of an actor, a learner, and a replay memory is implemented on a respective computing unit, wherein each bundle is configured to operate independently from each other bundle, and wherein, for each bundle, the learner in the bundle selects from among experience tuples generated by the actor in the bundle.

19. The method of claim 18, wherein, for each bundle, the current values of the parameters of the actor Q network replica maintained by the actor in the bundle are synchronized with the current values of the parameters of the learner Q network replica maintained by the learner in the bundle.

20. One or more non-transitory computer storage media encoded with instructions that, when executed by one or more computers, cause the one or more computers to implement a system for training a Q network used to control an agent that interacts with an environment by receiving observations characterizing a current state of the environment and performing an action from a predetermined set of actions in response to each observation, wherein the Q network is a deep neural network that is configured to receive as input an observation and an action and to generate a neural network output from the input in accordance with a set of parameters, wherein training the Q network comprises adjusting the values of the set of parameters of the Q network, and wherein the system comprises:

one or more actors, wherein each actor executes on a respective computing unit, wherein each actor is configured to operate independently of each other actor, wherein each actor interacts with a respective replica of the environment, wherein each actor maintains a respective actor Q network replica, and wherein each actor is further configured to repeatedly perform operations comprising:

receiving, from a parameter server, current values of the parameters of the Q network;

updating the values of the parameters of the actor Q network replica maintained by the actor using the current values;

receiving an observation characterizing a current state of the environment replica interacted with by the actor;

selecting an action to be performed in response to the observation using the actor Q network replica maintained by the actor;

receiving a reward in response to the action being performed and a next observation characterizing a next state of the environment replica interacted with by the actor;

generating an experience tuple that comprises the current observation, the action selected, the reward, and the next observation; and         storing the experience tuple in a respective replay memory for the actor for use in training the Q network.

* * * * *